United States Patent
Srinivas et al.

(10) Patent No.: US 12,168,423 B2
(45) Date of Patent: Dec. 17, 2024

(54) REVERSIBLE MOTOR CONFIGURED WITH MOTION STOPS FOR AIRCRAFT WINDSHIELD WIPER SYSTEM

(71) Applicant: Rosemount Aerospace Inc., Burnsville, MN (US)

(72) Inventors: Nouduri Phani Srinivas, Karnataka (IN); Srivatsa Santyar, Karnataka (IN)

(73) Assignee: ROSEMOUNT AEROSPACE INC., Burnsville, MN (US)

( * ) Notice: Subject to any disclaimer, the term of this patent is extended or adjusted under 35 U.S.C. 154(b) by 0 days.

(21) Appl. No.: 18/476,583

(22) Filed: Sep. 28, 2023

(65) Prior Publication Data

US 2024/0025375 A1  Jan. 25, 2024

Related U.S. Application Data

(62) Division of application No. 16/779,804, filed on Feb. 3, 2020, now Pat. No. 11,772,606.

(30) Foreign Application Priority Data

Dec. 9, 2019 (IN) .............................. 201911050812

(51) Int. Cl.
*B64C 1/14* (2006.01)
*B60S 1/08* (2006.01)
(Continued)

(52) U.S. Cl.
CPC ................. *B60S 1/08* (2013.01); *B60S 1/185* (2013.01); *B64C 1/14* (2013.01); *H02K 7/003* (2013.01);
(Continued)

(58) Field of Classification Search
CPC .. B60S 1/163; B60S 1/166; B60S 1/08; B60S 1/0814; B60S 1/16; B60S 1/185; B64C 1/14
(Continued)

(56) References Cited

U.S. PATENT DOCUMENTS 4,768,257 A   9/1988   Brusasco
5,086,260 A   2/1992   Ito
(Continued)

FOREIGN PATENT DOCUMENTS

KR   20170101720 A   9/2017
WO   2012120249 A1   9/2012

OTHER PUBLICATIONS

Machine language translation of description portion of WO publication 2012120249, published Sep. 2012. (Year: 2012).*
(Continued)

*Primary Examiner* — Gary K. Graham
(74) *Attorney, Agent, or Firm* — CANTOR COLBURN LLP

(57) ABSTRACT

Disclosed is an aircraft windshield wiper system, having: a wiper arm; a reversible motor that drives the wiper arm, the motor including: a stator; a rotor configured to rotate relative to the stator; a forward shaft segment that is driven by the rotor and being rotationally connected to the wiper arm; an aft shaft segment that is driven by the rotor, the aft shaft segment including a forward end and an aft end; a ball nut that translates along the aft shaft segment from rotation of the aft shaft segment; a forward stop at a forward end of the aft shaft segment, configured to stop forward translational motion of the ball nut along the aft shaft segment; and an aft stop at an aft end of the aft shaft segment, configured to stop aft translational motion of the ball nut along the aft shaft segment.

15 Claims, 5 Drawing Sheets

(51) Int. Cl.
| | |
|---|---|
| *B60S 1/16* | (2006.01) |
| *B60S 1/18* | (2006.01) |
| *H02K 7/00* | (2006.01) |
| *H02K 7/06* | (2006.01) |
| *H02K 7/08* | (2006.01) |
| *H02K 7/116* | (2006.01) |

(52) U.S. Cl.
CPC ............... *H02K 7/06* (2013.01); *H02K 7/083* (2013.01); *H02K 7/116* (2013.01); *B60S 1/166* (2013.01)

(58) Field of Classification Search
USPC .............................. 15/250.12, 250.13, 250.3
See application file for complete search history.

(56) References Cited

U.S. PATENT DOCUMENTS

| | | | |
|---|---|---|---|
| 6,205,613 B1 | 3/2001 | Sahara | |
| 6,799,654 B2 | 10/2004 | Menjak et al. | |
| 10,106,127 B2 | 10/2018 | Srivatsa et al. | |
| 2004/0216258 A1 | 11/2004 | Moosmann et al. | |
| 2006/0053577 A1 | 3/2006 | Moein et al. | |
| 2015/0343996 A1* | 12/2015 | Hong | ........................ B60S 1/24 74/89 |
| 2020/0391699 A1 | 12/2020 | Srinivas et al. | |
| 2021/0170993 A1 | 6/2021 | Srinivas et al. | |

OTHER PUBLICATIONS

Extended European Search Report for EP Application No. 20212482.2, dated Apr. 19, 2021, pp. 1-9.

* cited by examiner

REVERSIBLE MOTOR CONFIGURED WITH MOTION STOPS FOR AIRCRAFT WINDSHIELD WIPER SYSTEM

CROSS-REFERENCE TO RELATED APPLICATIONS

This application is a division of U.S. application Ser. No. 16/779,804 filed Feb. 3, 2020, which claims the benefit of Indian Application No. 201911050812, filed Dec. 9, 2019, the disclosure of each of which is incorporated herein by reference in its entirety.

BACKGROUND

The embodiments herein relate to windshield wiper systems for an aircraft and more specifically to a reversible motor configured with motion stops for such windshield wiper system.

A windshield wiper system is used on an aircraft to clean a wind shield of the aircraft, e.g., during rain. One type of windshield wiper system utilizes a crank rocker mechanism. In such a system, continuous rotation of a motor of the windshield wiper system is converted to oscillatory motion at a wiper shaft that is connected the crank rocker mechanism. For such a windshield wiper system, a sweep angle of the crank rocker mechanism is fixed mechanically. From this, the wiper shaft is constrained within the intended sweep angle. Another type of windshield wiper system utilizes a reversible brushless direct-current motor (reversible motor). Through electronic controls, the reversible motor achieves oscillatory motion directly from the motor shaft.

BRIEF SUMMARY

Disclosed is a windshield wiper system for an aircraft, comprising: a wiper arm; a reversible motor that drives the wiper arm, the reversible motor including: a stator; a rotor configured to rotate relative to the stator; a forward shaft segment, wherein the forward shaft segment is driven by the rotor and is rotationally connected to the wiper arm; an aft shaft segment, wherein the aft shaft segment is driven by the rotor, the aft shaft segment including a forward end and an aft end; a ball nut, wherein the ball nut translates along the aft shaft segment from rotation of the aft shaft segment; a forward stop at a forward end of the aft shaft segment, configured to stop forward translational motion of the ball nut along the aft shaft segment; and an aft stop at an aft end of the aft shaft segment, configured to stop aft translational motion of the ball nut along the aft shaft segment.

In addition to one or more of the above disclosed aspects, or as an alternate, the forward shaft segment and the aft shaft segment are segments of a motor shaft.

In addition to one or more of the above disclosed aspects, or as an alternate, the motor further includes: a housing, wherein the housing has a forward end wall and an aft end wall, wherein: the stator and the rotor are disposed within the housing; the forward shaft segment extends through the forward end wall of the housing; the aft shaft segment extends through the aft end wall of the housing; and the forward stop surface is formed by the aft end wall of the housing.

In addition to one or more of the above disclosed aspects, or as an alternate, the windshield wiper system further includes: an endcap fixed to the aft end wall of the housing, the endcap including an aft end wall spaced apart from the aft end wall of the housing, wherein: the aft shaft segment is disposed within the endcap; and the aft stop surface is defined by the aft end wall of the endcap.

In addition to one or more of the above disclosed aspects, or as an alternate: the ball nut includes a flange that defines a first passage; the windshield wiper system further includes: a first guide pin extending from the aft end wall of the housing to the aft end wall of the endcap such that the first guide pin is parallel to the aft shaft, wherein the first guide pin extends through the first passage in the flange of the ball nut and prevents rotation of the ball nut relative to the stator when the aft shaft segment rotates.

In addition to one or more of the above disclosed aspects, or as an alternate: a second passage is defined by the flange of the ball nut; and the windshield wiper system further includes: a second guide pin extending from the aft end wall of the housing to the aft end wall of the endcap such that the second guide pin is parallel to the aft shaft segment and is spaced apart from the first guide pin, wherein the second guide pin extends through the second passage in the flange of the ball nut.

In addition to one or more of the above disclosed aspects, or as an alternate, the first guide pin and the second guide pin are connected to the aft end wall of the housing.

In addition to one or more of the above disclosed aspects, or as an alternate, the reversible motor is a reversible brushless direct-current motor.

In addition to one or more of the above disclosed aspects, or as an alternate, the reversible motor is configured to stop responsive to the ball nut contacting the aft stop while the aft shaft segment rotates.

In addition to one or more of the above disclosed aspects, or as an alternate, the reversible motor is configured to stop responsive to sensing an increase in current drawn by the motor when the ball nut contacts the aft stop while the aft shaft segment rotates.

In addition to one or more of the above disclosed aspects, or as an alternate, the reversible motor is configured to stop responsive to the ball nut contacting the forward stop while the aft shaft segment rotates.

In addition to one or more of the above disclosed aspects, or as an alternate, the reversible motor is configured to stop responsive to sensing an increase in current drawn by the motor when the ball nut contacts the forward stop while the aft shaft segment rotates.

In addition to one or more of the above disclosed aspects, or as an alternate, the aft shaft segment is threaded, and the system further includes balls within the ball nut that engage the threads on the aft shaft segment, whereby the ball nut translates forward and aft when the aft shaft segment rotates.

In addition to one or more of the above disclosed aspects, or as an alternate, the windshield wiper system further includes: a reduction gear that rotationally couples the aft shaft segment to the wiper arm.

In addition to one or more of the above disclosed aspects, or as an alternate, a pinion gear is defined by the forward shaft segment, and the pinion gear is rotationally coupled to the reduction gear.

Further disclosed is an aircraft including a windshield wiper system having one or more of the above disclosed aspects.

Further disclosed is a method of operating a windshield wiper system, comprising: driving a rotor of a reversible motor relative to a stator of the reversible motor; driving an aft shaft segment of a motor shaft with the rotor; translating a ball nut from rotation of the aft shaft segment between a forward stop and an aft stop; and stopping the reversible motor when the ball nut contacts either of the forward stop and the aft stop while the aft shaft segment rotates.

In addition to one or more of the above disclosed aspects, or as an alternate, the method further includes: driving a reduction gear with a forward shaft segment of the motor shaft and driving a wiper arm with the reduction gear.

In addition to one or more of the above disclosed aspects, or as an alternate, the method further includes: preventing rotation of the ball nut relative to the stator with a guide pin extending through a passage defined in a flange of the ball nut, from the forward stop to the aft stop.

In addition to one or more of the above disclosed aspects, or as an alternate, the method further includes: stopping the reversible motor responsive to sensing an increase in current draw by the motor when the ball nut contacts either of the forward stop and the aft stop while the aft shaft segment rotates.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
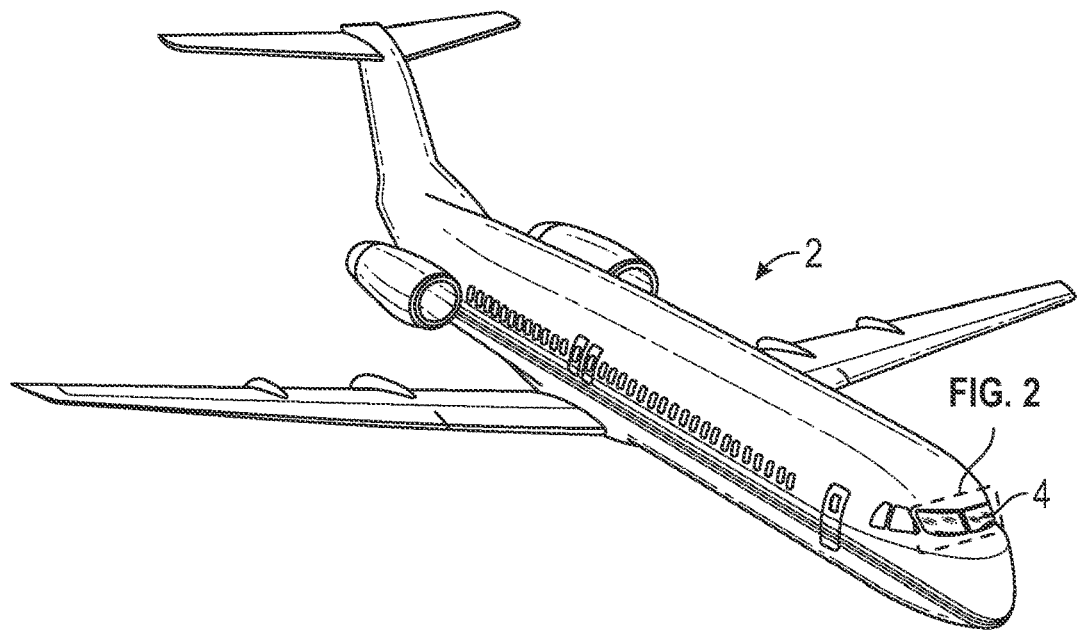
FIG. 1 is a perspective view of an aircraft that may include a windshield wiper system according to a disclosed embodiment.
Figure 2:
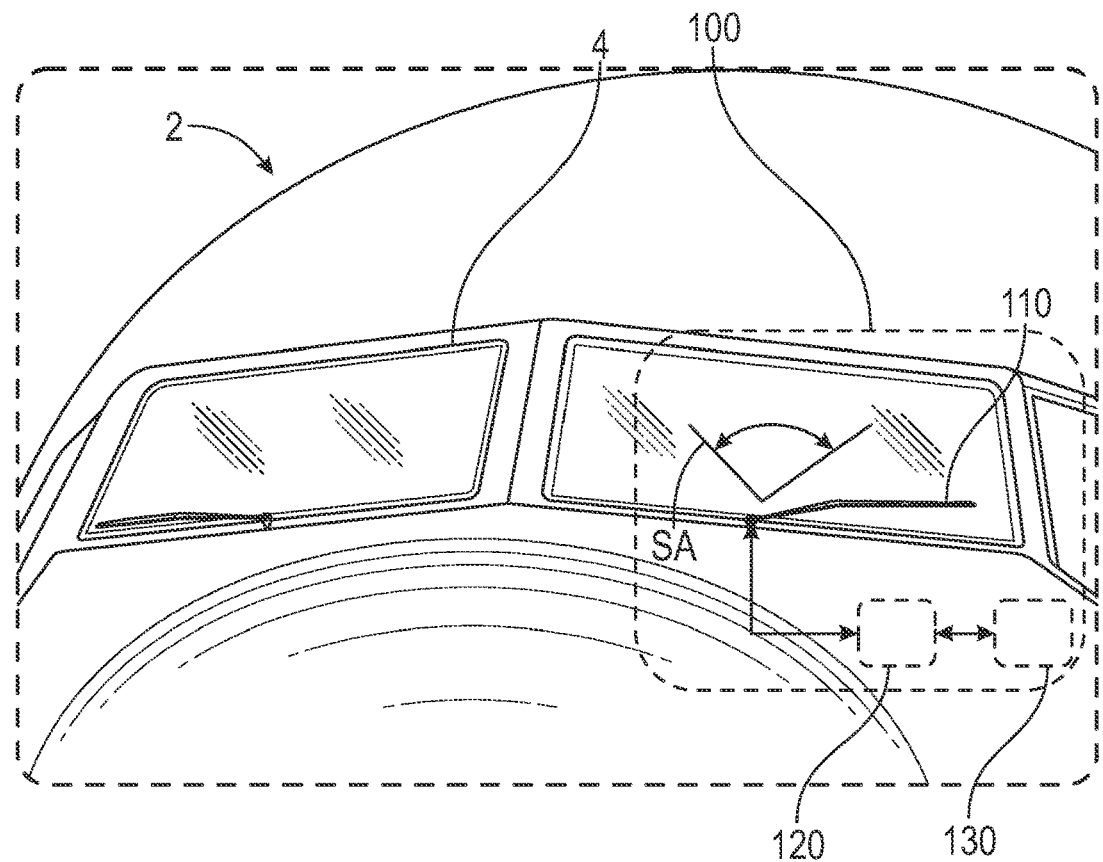
FIG. 2 shows a detail of section A of FIG. 1, showing aspects of a windshield wiper system according to a disclosed embodiment.

FIG. 1 shows an aircraft 2 having a windshield 4. As shown in FIG. 2, the aircraft 2 includes a windshield wiper system 100 for cleaning the windshield 4, e.g., during rain. The windshield wiper system 100 includes a wiper arm 110 driven by a reduction gear 120 that is powered by a motor 130. In such systems, the wiper arm 110 can traverse a sweep angle (SA) during operation. According to one non-limiting embodiment the wiper arm 110 is configured to sweep within a sweep angle SA of, e.g., (60) sixty degrees per sweep cycle at a rate of one hundred (100) cycles per minute (CPM).

Figure 3:
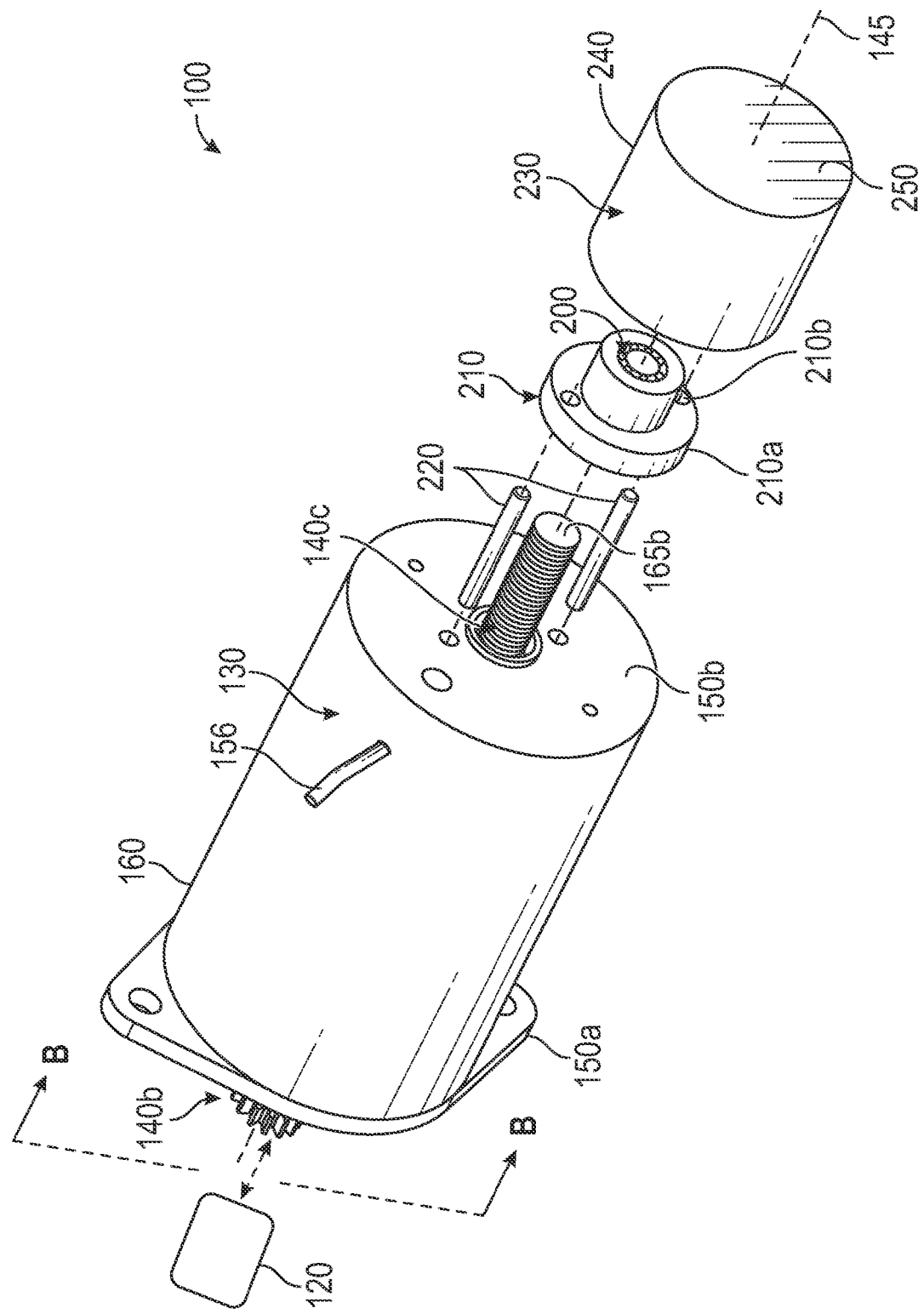
FIG. 3 shows a motor of the windshield wiper system according to a disclosed embodiment.
Figure 4:
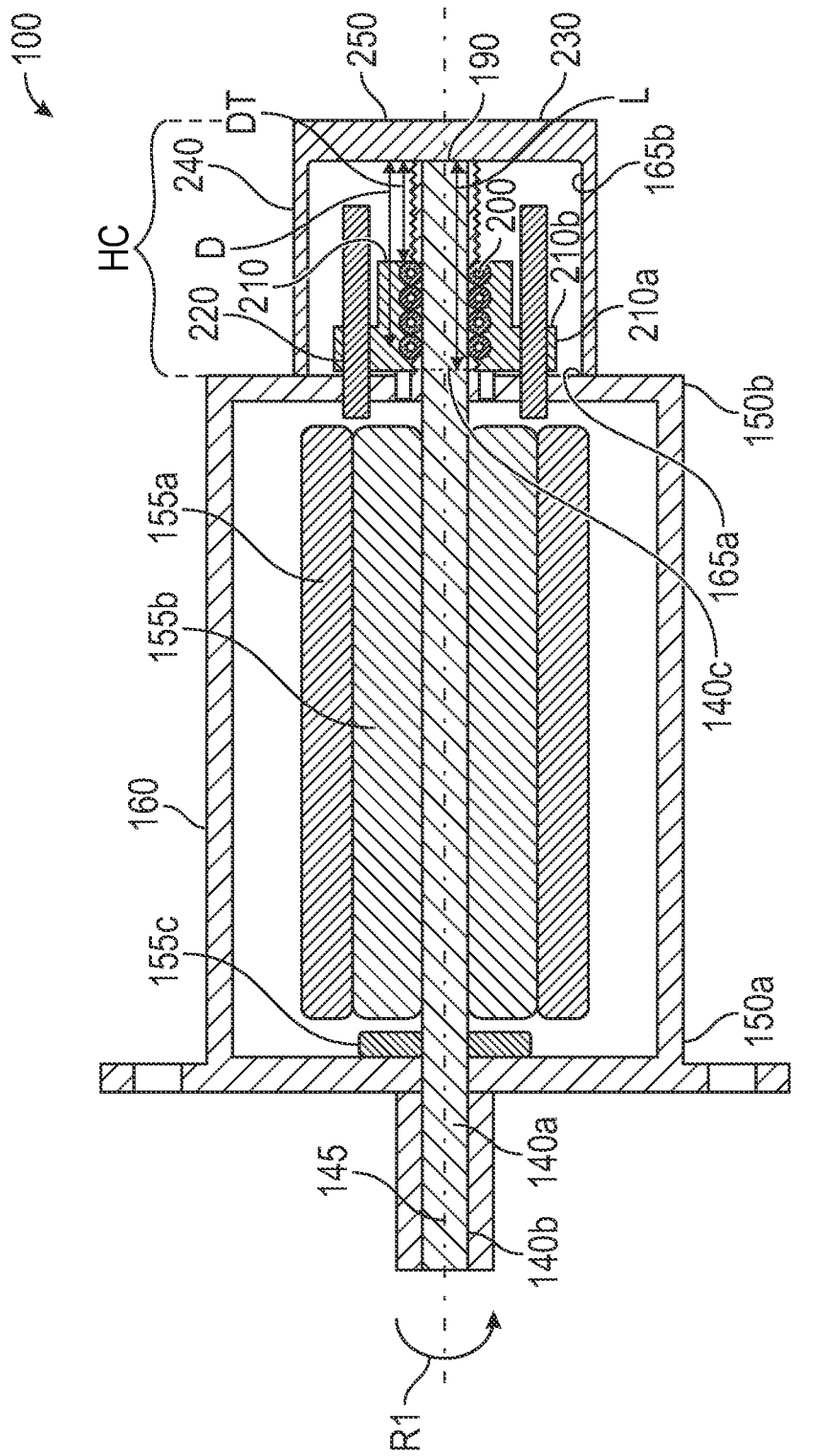
FIG. 4 shows a cross section of the motor along section lines B-B of FIG. 3, showing a ball nut in a forward position, disposed against an aft end of the motor housing.
Figure 5:
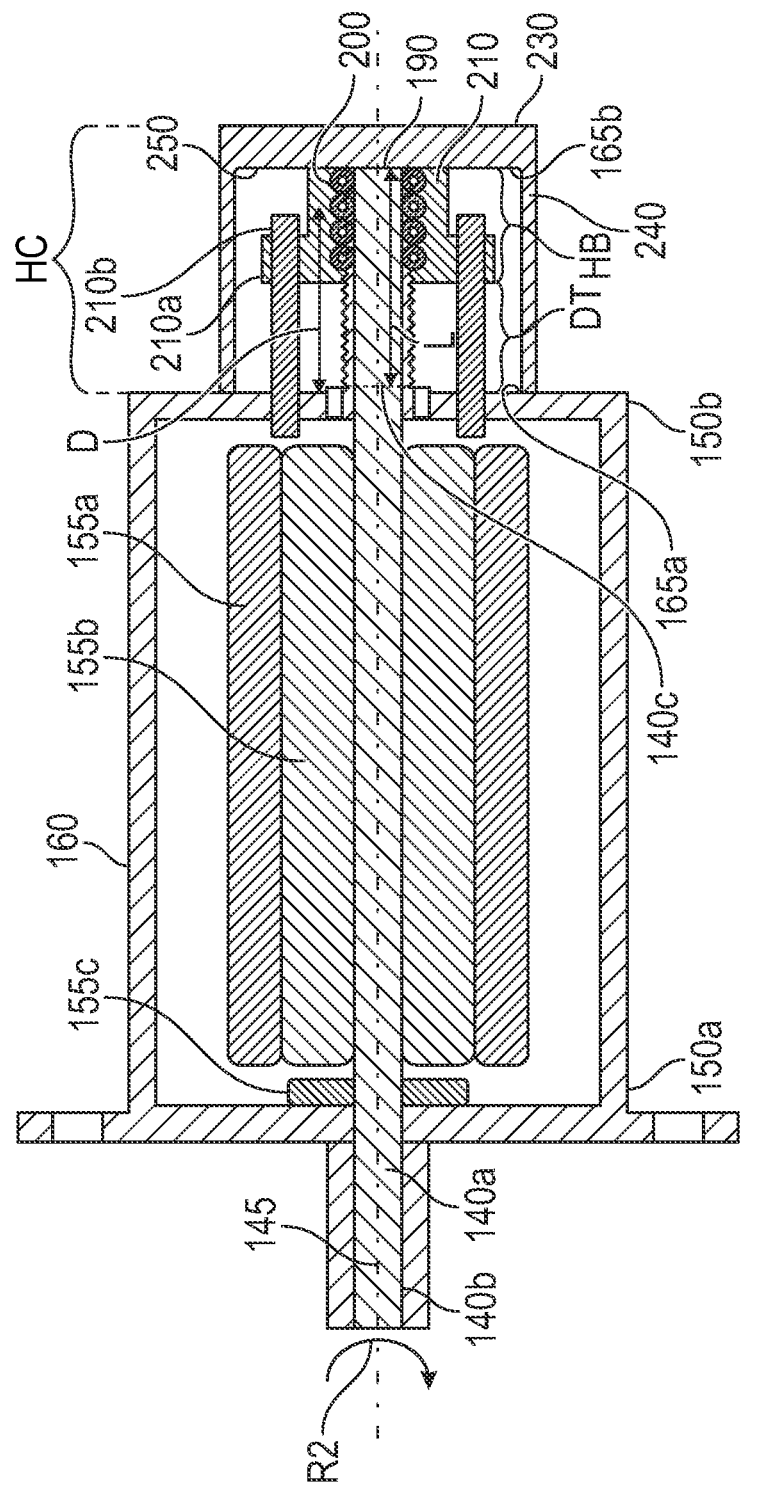
FIG. 5 shows the cross section of the motor along section lines B-B of FIG. 3, showing the ball nut in an aft position and disposed against an aft surface of an endcap connected to the motor housing.

Turning to FIG. 3-5 the motor 130 includes a motor housing 160. The motor housing 160 includes forward and aft ends 150a, 150b. As illustrated, the forward and aft ends 150a, 150b of the motor housing 160 are spaced apart along an axis 145. Within the housing 160, the motor 130 includes a stator 155a with associated coil windings (FIGS. 4-5). A rotor 155b (FIGS. 4-5) is configured to rotate relative to the stator 155a based on electrical power receive through one or more leads 156 (FIG. 3) extending through the housing 160. The rotor 155b drives a motor shaft 140a (FIGS. 4-5), which may be supported on a shaft bearing 155c (FIGS. 4-5). The motor shaft 140a defines a forward shaft segment 140b extending along the axis 145 through the forward end 150a of the housing 160. The motor shaft 140 also defines an aft shaft segment 140c (FIGS. 4-5) extending along the axis 145 through the aft end 150b of the housing 160.

The motor 130 of the windshield wiper system 100 may be a reversible brushless direct-current motor. Through electronic control of the motor 130, the motor 130 achieves oscillatory motion with the forward shaft segment 140b of the motor shaft 140a. As illustrated, the forward shaft segment 140b drives the reduction gear 120 (FIGS. 2-3). In addition, the forward shaft segment 140b includes a pinion gear profile (FIG. 3) for meshing with the reduction gear 120.

The windshield wiper system 100 includes a ball nut 210. The ball nut 210 translates along the aft shaft segment 140c from rotation of the aft shaft segment 140c. This configuration forms a ball screw type linear actuator. A ball screw is a mechanical linear actuator that translates rotational motion, i.e., the aft shaft segment 140c, to linear motion of the ball nut 210 with little friction. A ball screw is able to apply or withstand high thrust loads with minimum internal friction and is machinable to close tolerances. The ball screw is therefore generally suitable for use in situations in which require high precision. The aft shaft segment 140c is formed with a helical raceway for engaging ball bearings 200 in the ball nut 210, which acts as a precision screw. Thus, as the aft shaft segment 140c rotates with the motor shaft 140a, the rotation of the aft shaft segment 140c is converted to linear motion of the ball nut 210 along the axis 145.

As more clearly shown in FIGS. 4-5, a forward stop 165a is formed by the aft end 150b of the housing 160. The forward stop 165a is configured to stop forward translational motion of the ball nut 210 along the aft shaft segment 140c. An aft stop 165b is located at an aft end 190 of the aft shaft segment 165b. The aft stop 165b is configured to stop aft translational motion of the ball nut 210 along the aft shaft segment 140c. With this configuration, the aft shaft segment 140c, the ball nut 210, and the forward and aft stops 165a, 165b together form a motion limiter located at the aft end 150b of the motor housing 160. This configuration prevents over rotation of the motor shaft 140a. This prevents over sweep of the wiper arm 110 (FIG. 2). As a result, damage to the wiper arm 110 and aircraft 2 around the windshield 4 (FIG. 2) is potentially avoided. As disclosed herein, when over rotation of the motor shaft 140a in either direction is encountered, the motor 130 is stopped. The windshield wiper system 100 may thereafter be serviced as needed to restore a desired operational state.

Rotational motion of the ball nut 210, e.g., relative to the stator 155a is prevented with one or more guide pins 220. The guide pins 220 extend from the aft end 150b of the motor housing 160, parallel with and along-side the aft shaft segment 140c. The ball nut 210 includes a flange 210a, which is cylindrical and defines one or more passages 210b through which the respective one or more guide pins 220 extend. The one or more guide pins 220 may have a same length as the aft shaft segment 140c to prevent run-off of the flange 210a as the ball nut 210 moves along the aft shaft segment 140c. In the illustrated embodiment a pair of the guide pins 220 are utilized, though this is not intended on limiting the scope of the disclosed embodiments.

The aft shaft segment 140c with the ball nut 210 and the guide pins 220 are encased against the aft end 150b of the motor housing 160 by an endcap 230. The endcap 230 is cylindrical having a sidewall 240 with an inner diameter that is larger than the flange 210a of the ball nut 210. An aft wall 250 of the endcap 230 is located near or against an aft end 190 of the aft shaft segment 140c. The aft wall 250 of the endcap 230 forms the aft stop 165b.

The opposing radial directions in which the motor 130 rotates per wiper sweep cycle are illustrated in FIGS. 4-5. The opposing radial directions include a first rotational direction R1 (as illustrated in FIG. 4) and a second rotational direction R2 (as illustrated in FIG. 5). The direction of translation D of the ball nut 210 will reverse when rotation of the aft shaft segment 140c reverses, e.g., at each wiper sweep cycle. The ball nut 210 translates toward the aft end 150b of the motor housing when the motor 130 rotates the aft shaft segment 140c in the direction R1 during one wiper sweep cycle. The ball nut 210 translates toward the aft wall 250 of the endcap 230 when the motor 130 rotates the aft shaft segment 140c in the direction R2 during another wiper sweep cycle.

Further, the ball nut 210 translates, during each wiper sweep cycle, by travel distance DT along the aft shaft segment 140c. The travel distance DT is a function of on a thread pitch of the aft shaft segment 140c. During movement of the ball nut 210, the aft end 150b of the motor housing 160 and the aft wall 250 of the endcap 230, as indicated above, may respectively form the forward stop and the aft stop (e.g. motion stops). This configuration may prevent over travel of the ball nut 210 against the aft shaft segment 140c during each wiper sweep cycle. Preventing the ball nut 210 from traveling beyond the travel distance DT during each wiper sweep cycle may prevent over rotation of the wiper arm 110.

The following non-limiting example demonstrates a process in determining the travel distance DT to restrict the linear travel of the ball nut 210. The process requires determining the number of complete rotations of the aft shaft segment 140c per wiper sweep cycle. This is a function of the gear reduction ratio and the sweep angle SA. The process then requires determining the travel distance DT as a function of the number of complete rotations of the aft shaft segment 140c per wiper sweep cycle (calculated) and the thread pitch for the aft shaft segment 140c.

In one non-limiting embodiment the windshield wiper system 100 is configured as follows: a sweep speed of the wiper arm 110 (FIG. 2) is one hundred (100) cycles per minute (CPM); a total sweep angle SA of the wiper arm 110 is sixty (60) degrees (FIG. 2); the reduction gear 120 is configured to provide a reduction gear ratio of fifty to one (50:1); and the aft shaft segment 140c is threaded, e.g., with a helical groove, at ten (10) threads per inch (TPI).

The number of complete rotations of the aft shaft segment 140c per wiper sweep cycle is calculated by a first formula of:

(gear reduction×sweep angle)÷(360 degrees per rotation).

The gear reduction of fifty to one (50:1) and the sweep angle SA of the wiper arm 110 is sixty (60) degrees. Thus the first formula provides (50×60/360)=eight and a third (8.33) rotations per wiper sweep cycle.

The travel distance DT of the ball nut 210 per wiper sweep cycle is calculated by a second formula of:

(number of completed rotations of the aft shaft segment 140c per wiper sweep cycle (calculated above))÷(the thread pitch of the aft shaft segment 140c).

The thread pitch on the aft shaft segment 140c is ten (10) TPI. Thus the second formula provides (8.33/10)=(0.833) inches of travel for the ball nut 210 per wiper sweep cycle. Therefore, a travel distance DT of the ball nut 210 can be (0.850) inches per wiper sweep cycle, accounting for clearance.

To provide the travel distance DT for the ball nut 210, a height HC of the endcap 230, and length L of the aft shaft segment 140c that extends beyond the aft end 150b of the motor housing 160, are properly sized. The height HC of the endcap 230 may differ from the length L of the aft shaft segment 140c by the thickness of the aft wall 250 of the endcap 230, which may be considered nominal so these two measurements may be substantially the same. Thus, the height HC of the endcap 230 may be a total distance between the aft end 150b of the motor housing 160 and the aft wall 250 of the endcap 230. Thus, the height HC would be the travel distance DT (calculated above), combined with a height HB (FIG. 5) of the ball nut 210, which may be measured.

For design of the motor 130, it is noted that the speed in revolutions per minute (RPM) of the aft shaft segment 140c per wiper sweep cycle is a function of the gear reduction ratio and the sweep speed. That is, the gear reduction ratio is fifty to one (50:1) and the sweep speed of the wiper arm 110 is one hundred (100) CPM. With this, the aft shaft segment 140c will have a speed of:

gear reduction×sweep speed of wiper arm 110.

This results in (50×100), or five thousand (5000) RPM.

With the above configuration, as indicated, the ball nut 210 will be prevented from traveling more than the travel distance DT. The motor 130 will be unable to produce over rotation in either direction R1 or R2 and instead will experience an over current draw. An over current trip logic, which may be programmed into the motor 130, may execute upon sensing an over current draw from the motor 130, shutting down the motor 130.

Figure 6:
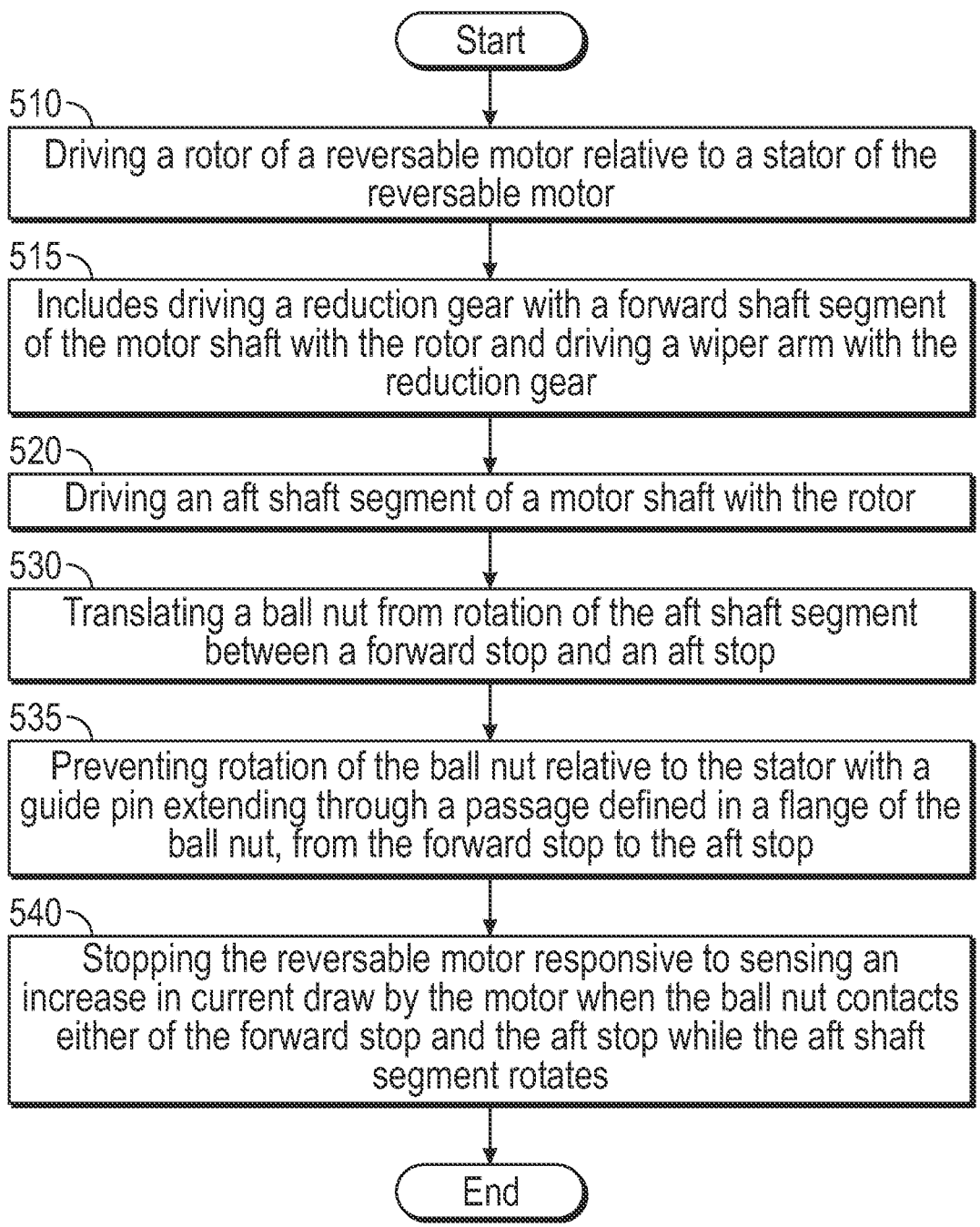
FIG. 6 is a flowchart showing a method of operating a windshield wiper system according to a disclosed embodiment.

Turning to FIG. 6 a flowchart shows a method of operating the system 100. As shown in block 510 the method includes driving a rotor 155b of a reversible motor 130 relative to a stator 155a of the reversible motor 130. As shown in block 515 the method includes driving a reduction gear 120 with a forward shaft segment 140b of the motor shaft 140a with the rotor 155b and driving a wiper arm 110 with the reduction gear 120. As shown in block 520 the method includes driving an aft shaft segment 140c of a motor shaft 140a with the rotor 155b. As shown in block 530 the method includes translating a ball nut 210 from rotation of the aft shaft segment 140c between a forward stop 165a and an aft stop 165b. As shown in block 535 the method includes preventing rotation of the ball nut 210 relative to the stator 155a with a guide pin 220 extending through a flange 210a of the ball nut 210, from the forward stop 165a to the aft stop 165b. As shown in block 540 the method includes stopping the reversible motor responsive to sensing an increase in current draw by the motor when the ball nut contacts either of the forward stop and the aft stop while the aft shaft segment rotates.

In sum the disclosed embodiments provide for stopping/halting rotation of a motor shaft using ball screw mechanism. The disclosed embodiments utilize an over current-trip of the motor, where the over current-trip is activated at a locked rotor condition that occurs from stoppage of the ball nut. The system is formed and assembled utilizing common manufacturing techniques. The system is relatively easily configurable, depending largely on a sweep angle of the wiper blade arm. One benefit of the disclosed embodiments includes protecting aircraft, wiper components and related hardware from damage that could result from over sweep. A stopping torque required to engage the over current-trip of the motor with the disclosed embodiments is significantly decreased compared with motion limiters located away from the motor. The reduced wear on the motor results in a more reliable system.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A method of operating a windshield wiper system, wherein the windshield wiper system includes:
    a reversible motor that drives a wiper arm,
        wherein the reversible motor includes:
        a stator;
        a rotor that rotates relative to the stator;
        a forward shaft segment that is driven by the rotor and is rotationally connected to the wiper arm;
        an aft shaft segment that is driven by the rotor, the aft shaft segment including a forward end and an aft end;
    a ball nut that translates along the aft shaft segment from rotation of the aft shaft segment;
    a forward stop, at a forward end of the aft shaft segment,
        wherein the forward stop stops forward translational motion of the ball nut along the aft shaft segment; and
    an aft stop at an aft end of the aft shaft segment,
        wherein the aft stop stops aft translational motion of the ball nut along the aft shaft segment; and
    the reversible motor further includes:
        a housing,
            wherein the housing has a forward end wall and an aft end wall, and
            wherein:
                the stator and the rotor are disposed within the housing;
                the forward shaft segment extends through the forward end wall of the housing;
                the aft shaft segment extends through the aft end wall of the housing; and
                the forward stop is formed by the aft end wall of the housing; and
    the method comprising:
    driving the rotor relative to the stator;
    driving the aft shaft segment of the motor shaft with the rotor;
    translating the ball nut from rotation of the aft shaft segment between the forward stop and the aft stop; and
    stopping the reversible motor when the ball nut contacts either of the forward stop, at the aft end wall of the housing, and the aft stop while the aft shaft segment rotates.

2. The method of claim 1, further comprising:
    driving a reduction gear with the forward shaft segment of the motor shaft and driving the wiper arm with the reduction gear.

3. The method of claim 1, further comprising:
    preventing rotation of the ball nut relative to the stator with a guide pin extending through a passage defined in a flange of the ball nut, from the forward stop to the aft stop.

4. The method of claim 3, wherein the windshield wiper system further includes:
    an endcap fixed to the aft end wall of the housing, the endcap including an aft end wall spaced apart from the aft end wall of the housing, wherein:
        the aft shaft segment is disposed within the endcap; and
        the aft stop is defined by the aft end wall of the endcap.

5. The method of claim 1, further comprising: stopping the reversible motor responsive to sensing an increase in current draw by the motor when the ball nut contacts either of the forward stop and the aft stop while the aft shaft segment rotates.

6. The method of claim 5, wherein:
    the ball nut includes a flange that defines a first passage;
    the windshield wiper system further includes:
        a first guide pin extending from the aft end wall of the housing to the aft end wall of the endcap such that the first guide pin is parallel to the aft shaft,
        wherein the first guide pin extends through the first passage in the flange of the ball nut and prevents rotation of the ball nut relative to the stator when the aft shaft segment rotates.

7. The method of claim 6, wherein:
    a second passage is defined by the flange of the ball nut; and
    the windshield wiper system further includes:
        a second guide pin extending from the aft end wall of the housing to the aft end wall of the endcap such that the second guide pin is parallel to the aft shaft segment and is spaced apart from the first guide pin,
        wherein the second guide pin extends through the second passage in the flange of the ball nut.

8. The method of claim 7, wherein the first guide pin and the second guide pin are connected to the aft end wall of the housing.

9. The method of claim 8, wherein the reversible motor stops responsive to sensing an increase in current drawn by the motor when the ball nut contacts the aft stop while the aft shaft segment rotates.

10. The method of claim 1, wherein the forward shaft segment and the aft shaft segment are segments of the motor shaft.

11. The method of claim 1, wherein the reversible motor is a reversible brushless direct-current motor.

12. The method of claim 1, wherein the reversible motor stops responsive to the ball nut contacting the aft stop while the aft shaft segment rotates.

13. The method of claim 1, wherein the aft shaft segment is threaded, and the system further includes balls within the ball nut that engage the threads on the aft shaft segment, whereby the ball nut translates forward and aft when the aft shaft segment rotates.

14. The method of claim 1, wherein the windshield wiper system further includes a reduction gear that rotationally couples the aft shaft segment to the wiper arm.

15. The method of claim 14, wherein a pinion gear is defined by the forward shaft segment, and the pinion gear is rotationally coupled to the reduction gear.

* * * * *